Oct. 7, 1924.
W. BARCLAY
1,510,537
TOOL FOR MANIPULATING SPLIT RIMS FOR VEHICLE WHEELS
Filed June 13, 1924
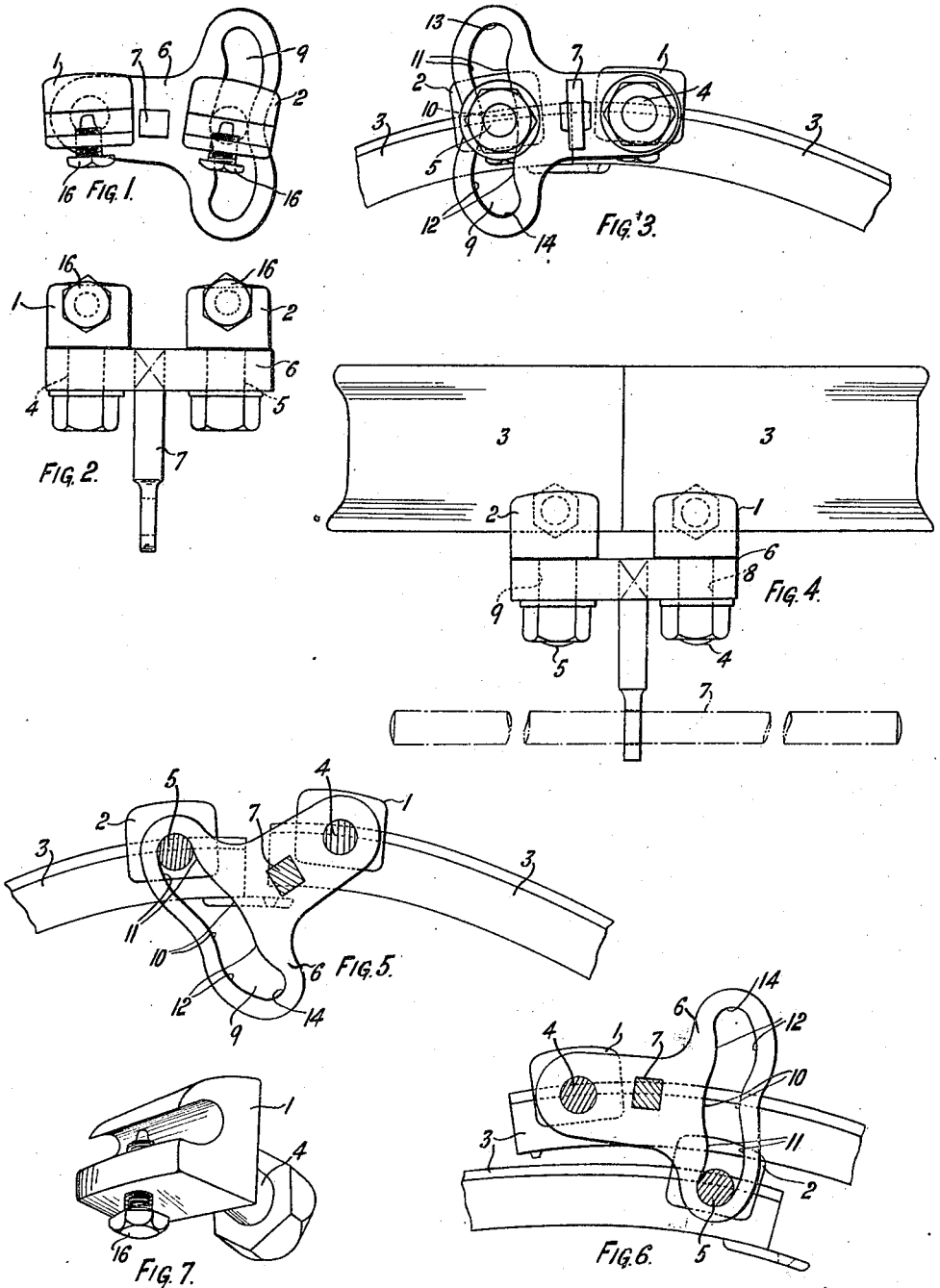
Inventor
William Barclay
By Pennie, Davis, Marvin & Edmond
Attorneys Patented Oct. 7, 1924.

1,510,537

UNITED STATES PATENT OFFICE.

WILLIAM BARCLAY, OF GLASGOW, SCOTLAND.

TOOL FOR MANIPULATING SPLIT RIMS FOR VEHICLE WHEELS.

Application filed June 13, 1924. Serial No. 719,746.

*To all whom it may concern:*

Be it known that I, WILLIAM BARCLAY, a subject of the King of Great Britain and Northern Ireland, and residing at Glasgow, Scotland, have invented a certain new and useful Improvement in Tools for Manipulating Split Rims for Vehicle Wheels, of which the following is a specification.

This invention relates to a tool for manipulating split rims comprising a pair of clamps attachable respectively to the adjacent ends of the rim and provided with journal posts engageable by a rocker the rocking movement of which causes one end of the rim to move relatively to the other end whereby the rim is contracted or expanded.

According to the invention the rocker is constituted by a cam-plate having a fulcrum bearing to receive the post of the relatively fixed clamp and a cam-slot spaced from said bearing to receive a follower constituted by the post of the relatively movable clamp, the configuration of the cam-slot being such that, when the cam-plate is rocked to contract the rim, the movable end of the rim is caused to move circumferentially away from the fixed end and then is caused to move inwardly into contracted position, and, when the cam-plate is rocked to expand the rim, the movable end of the rim is moved outwardly into expanded position and then circumferentially towards the fixed end.

In the accompanying drawing Figs. 1 and 2 are respectively a rear elevation and an inverted plan of the tool. Figs. 3 and 4 are respectively a front elevation and a plan of the tool shown as attached to a split rim, the rim being in expanded position. Fig. 5 is a part front elevation part section showing the rim with the ends separated, Fig. 6 a front elevation showing the rim in contracted position, and Fig. 7 an inverted perspective view of a clamp.

The tool shown comprises a pair of clamps 1, 2 attachable respectively to the adjacent ends of a rim 3 and provided with journal posts 4, 5 engageable by a rocker operable by angular movement of a stem 7 provided with a handle so as to cause one end of the rim to move relatively to the other end whereby the rim is contracted or expanded.

The rocker is constituted by a cam-plate 6 having a fulcrum bearing 8 to reecive the post 4 of the relatively fixed clamp 1 and a cam-slot 9 to receive the follower constituted by the post 5 of the relatively movable clamp 2. The cam-slot has a dwell 10 occupied by the post 5 when the rim ends are together and rises 11, 12 engaged by the post 5 when the rim ends are forced into the position shown in Fig. 5, the rise 11 being engaged when the rim is about to be contracted and the rise 12 being engaged when the rim is being restored from the Fig. 5 position into the Fig. 3 position. When the cam-plate is rocked to contract the rim, the free end of the rim is caused by the rise 11 to move circumferentially away from the fixed end into the Fig. 5 position and then is caused by the boundary 13 of the slot acting on the post 5 to move inwardly into the contracted position shown in Fig. 6. When the cam-plate is rocked to expand the rim, the free end of the rim is moved outwardly into expanded position by the boundary 14 of the slot acting on the post 5 and then on reversal of movement of the cam-plate is caused by the rise 12 acting on the post 5 to move circumferentially towards the fixed end into the Fig. 3 position.

The clamps each comprise a jaw defining a gap shaped to receive the edge of a rim and having a screw-threaded perforation to receive a pinching screw 16 engageable with the rim.

What I claim is:—

1. A tool for manipulating split rims comprising, in combination, a pair of clamps one attachable to the relatively fixed end of a rim and the other attached to the relatively movable end of said rim and each provided with a journal post, a rocker constituted by a cam-plate having a fulcrum bearing to receive the journal post of the first clamp and a cam-slot spaced therefrom engaged by the journal post of the second clamp, and means for rocking said cam-plate, the configuration of said cam-slot being such that, when the cam-plate is rocked to contract the rim, the relatively movable end of the rim is moved circumferentially away from the fixed end and is then moved inwardly into contracted position, and, when the cam-plate is rocked to expand the rim, the relatively movable end of the rim is moved outwardly into expanded position and then circumferentially towards the fixed end.

2. A tool for manipulating split rims comprising, in combination, a pair of clamps one attachable to the relatively fixed end of a rim and the other attached to the relatively movable end of said rim, and each provided with a journal post, a rocker constituted by a cam-plate having a fulcrum bearing to receive the journal post of the first clamp and a cam-slot spaced therefrom to receive as follower the journal post of said second clamp, and means for rocking said cam-plate, said cam-slot having a first rise, a second rise and a dwell intermediate said rises, said first rise engageable with the follower journal post to separate the ends of said rim prior to the contracting operation and said second rise engageable with the follower journal post to bring said ends together subsequent to the expanding operation.

In testimony whereof I have signed my name to this specification in the presence of two subscribing witnesses.

WILLIAM BARCLAY.

Witnesses:
ISABEL ROLLS,
DOROTHY BLACKIE.